US012582955B2

(12) United States Patent
Skachkov et al.

(10) Patent No.: US 12,582,955 B2
(45) Date of Patent: Mar. 24, 2026

(54) METHOD AND DESIGN OF HEAT EFFECTIVE ROTATED PACKED BED

(71) Applicant: Schlumberger Technology Corporation, Sugar Land, TX (US)

(72) Inventors: Roman Alexandrovich Skachkov, Rosharon, TX (US); Shahnawaz Hossain Molla, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 484 days.

(21) Appl. No.: 18/181,176

(22) Filed: Mar. 9, 2023

(65) Prior Publication Data

US 2024/0299896 A1 Sep. 12, 2024

(51) Int. Cl.
B01J 10/00 (2006.01)
B01J 19/26 (2006.01)

(52) U.S. Cl.
CPC ............... B01J 10/00 (2013.01); B01J 19/26 (2013.01)

(58) Field of Classification Search
CPC ........... B01J 10/00; B01J 19/26; B01D 1/222; B01D 3/08; B01D 3/26; B01D 3/30
USPC .......................................................... 261/88
See application file for complete search history.

(56) References Cited

U.S. PATENT DOCUMENTS 2,281,616 A 5/1942 Placek
3,135,588 A 6/1964 Helming
3,640,330 A 2/1972 Javet
3,809,375 A 5/1974 Bonnet
4,549,998 A * 10/1985 Porter .................. B01J 19/0066
261/88
4,995,945 A 2/1991 Craig
5,363,909 A * 11/1994 Acharya .................. B01D 3/30
165/111
5,955,326 A 9/1999 Bungay, III et al.
6,884,284 B1 4/2005 Jensen
7,344,126 B2 3/2008 Ji et al.
7,550,116 B2 6/2009 Wilhelm et al.
7,649,024 B2 1/2010 Li et al.
7,666,950 B2 2/2010 Ong et al.
8,448,926 B2 5/2013 Mello et al.
8,475,616 B2 7/2013 McCutchen
8,551,295 B2 10/2013 Chen et al.
8,568,597 B2 10/2013 Su et al.
8,679,232 B2 3/2014 Wolf
(Continued)

FOREIGN PATENT DOCUMENTS

CN 101372522 2/2009
CN 201529413 7/2010
(Continued)

OTHER PUBLICATIONS

Search Report and Written Opinion of International Patent Application No. PCT/US2024/019062 dated Jul. 1, 2024, 11 pages.
(Continued)

*Primary Examiner* — Charles S Bushey
(74) *Attorney, Agent, or Firm* — Kyle R. Miiller

(57) ABSTRACT

Embodiments presented provide for a method and design of heat effective rotated packed beds wherein rotating packed bed technologies have heat transfer capabilities to enhance separation, absorbing and desorbing capabilities. Such beds are used in industries including heavy processing, chemical, petrochemical and pharmaceutical industries.

11 Claims, 8 Drawing Sheets

(56) References Cited

U.S. PATENT DOCUMENTS

| 9,102,545 | B2 | 8/2015 | Riley | |
| 9,987,589 | B2 | 6/2018 | Kotagiri et al. | |
| 10,821,393 | B2 | 11/2020 | Elliott et al. | |
| 12,383,846 | B2 * | 8/2025 | Skachkov | C02F 1/08 |
| 2004/0015003 | A1 | 1/2004 | Yang et al. | |
| 2005/0022666 | A1 | 2/2005 | Liu et al. | |
| 2008/0038115 | A1 | 2/2008 | Burns et al. | |
| 2008/0267843 | A1 | 10/2008 | Burns et al. | |
| 2010/0068381 | A1 | 3/2010 | Liu | |
| 2010/0242348 | A1 | 9/2010 | Chen et al. | |
| 2011/0214979 | A1 | 9/2011 | Chen | |
| 2011/0303088 | A1 | 12/2011 | Dutra E Mello | |
| 2012/0039795 | A1 | 2/2012 | Chen | |
| 2013/0319235 | A1 | 12/2013 | Wolf | |
| 2014/0050633 | A1 | 2/2014 | van der Schaaf et al. | |
| 2014/0066580 | A1 | 3/2014 | Joo et al. | |
| 2016/0243495 | A1 | 8/2016 | Dutra e Mello | |
| 2016/0317967 | A1 | 11/2016 | Kotagiri | |
| 2018/0056234 | A1 | 3/2018 | Weng | |
| 2020/0261846 | A1 | 8/2020 | Mobley | |
| 2024/0299860 | A1 | 9/2024 | Skachkov | |

FOREIGN PATENT DOCUMENTS

| CN | 103463938 | A | 12/2013 |
| CN | 104841346 | A | 8/2015 |
| CN | 106040159 | A | 10/2016 |
| CN | 110339655 | A | 10/2019 |
| CN | 112934156 | A | 6/2021 |
| CN | 113006905 | A | 6/2021 |
| EP | 0002568 | A1 | 6/1979 |
| EP | 0053881 | B1 | 5/1985 |
| EP | 1464389 | A1 | 10/2004 |
| EP | 2018900 | A3 | 9/2010 |
| IN | 201921008821 | | 3/2019 |
| IN | 201921019515 | | 5/2019 |
| WO | 2011094984 | A1 | 8/2011 |
| WO | 2013143243 | A1 | 10/2013 |

OTHER PUBLICATIONS

Search Report and Written Opinion of International Patent Application No. PCT/US2024/019041 dated Jul. 3, 2024, 11 pages.

Office Action issued in U.S. Appl. No. 18/181,201 dated Dec. 16, 2024, 18 pages.

Chandra, A. et al., "Characteristics of Flow in a Rotating Packed Bed (HIGEE) with Split Packing", Industrial & Engineering Chemical Research, 2005, 44, pp. 4051-4060.

Cortes Garcia, G. E. et al., "A review on process intensification in HiGee distillation", Journal of Chemical Technology and Biotechnology, 2017, 92, pp. 1136-1156.

Lin, C.-C. et al., "Characteristics of a rotating packed bed equipped with blade packings", Separation and Purification Technology, 2007, 54(1), pp. 51-60.

Munjal, S. et al., "Mass-Transfer in Rotating Packed Beds—I. Development of Gas-Liquid and Liquid-Solid Mass-Transfer Correlations", Chemical Engineering Science, 1989, 44(10), pp. 2245-2256.

Oko, E. et al., "Current status and future development of solvent-based carbon capture", International Journal of Coal Science & Technology, 2017; 4(1), pp. 5-14.

Rao, D. P. et al., "Torsional-Couette-Flow HiGee", Chemical Engineering and Processing—Process Intensification, 2020, 147, 107722, 7 pages.

Sivalingam, G. et al., "Process Intensification in a Model Trickle Bed Reactor", Industrial & Engineering Chemistry Research, 2002, 41(13), pp. 3139-3144.

Youzhi, L., et al., "Mass transfer characteristics in a rotating packed bed with split packing", Chinese Journal of Chemical Engineering, 2015, 23(5), pp. 868-872.

Yu, Y.-L. et al., "Experimental study on characteristics of electric power consumption of the zigzag rotating bed", Petro-Chemical Equipment, 2004, 33(4), 4 pages with English Abstract.

* cited by examiner

800

Start

802 — Provide fluid stream

804 — Inserting fluid stream into rotating fluid bed

806 — Rotating at least one disk

810 — Exiting liquid phase and gas phase from rotating bed

End

METHOD AND DESIGN OF HEAT EFFECTIVE ROTATED PACKED BED

CROSS-REFERENCE TO RELATED APPLICATIONS

None

FIELD OF THE DISCLOSURE

Aspects of the disclosure relate to packed beds used in heavy industry. More specifically, aspects of the disclosure relate to highly effective packed bed designs for rotated packed bed technologies, wherein the rotating packed bed technologies have heat transfer capabilities to enhance separation, absorption, desorption and interphase heat exchange capabilities.

BACKGROUND

Separation, absorption, desorption and interphase heat exchange processes play a vital role in most of the heavy processing, chemical, petrochemical, and pharmaceutical industries. These processes are used because of the necessity to process chemicals, particularly extract and dispose of the main atmospheric pollutants, largely: sulfur dioxide, hydrogen sulfide, nitrous oxide, ammonia, various hydrocarbons, and carbon dioxide—the main contributor to global warming. Additionally, the industries also normally use processes that utilize liquids where dissolved gases within those liquids would lead to the deterioration of characteristics of the end products as well as damage to the processing systems themselves. Industry craves high quality liquids, free from dissolved gases, in order to make many products of today's society.

As the standard solution to the problems above, namely dissolved gases within liquids, industries currently utilize packed bed columns. Though great variability in their designs and parameters exist, the main principle remains the same—the liquid flows under the influence of the earth's gravity contra directionally to the gas stream. In these designs, gravity determines the allowable liquid and gas throughputs and achievable mass-transfer rates that, in turn, stipulate the high bulkiness of the packed bed columns for industrial-scale facilities. One of the designs to make the packed beds compact is Rotated Packed Beds (RPBs), also known as "HiGees". The name "HiGees" is used because centripetal acceleration in the rotated packed beds can achieve 1000g, where g is defined as the normal acceleration of gravity. Such designs allow the use of packing with 10 times larger surface area, which corresponds to 10 times higher mass-transfer rate. Since the liquid flows as thin films under the high centripetal acceleration, there is an enhancement in the liquid-side mass-transfer coefficient. The mass-transfer coefficient could be 2 to 8 times higher than that in a conventional packed column, leading to much greater efficiency. As a result, RPBs can be $\frac{1}{10}$ the size compared to conventional packed bed columns (see, FIG. 1). Such reduction in size can greatly decrease the capital costs associated with construction.

Though there are a number of packed beds successfully operating in the industry, all the details of the processes inside them are not completely understood, and their architecture and optimal design parameters are still under research and development. The existing development of such designs is governed not only by diversity and range of operational requirements (which are different for gas sweetening and oxygen removal from liquid, for instance) but also by providing them with a more efficient/compact design. Also of importance is the overall capital cost of construction. Indeed, the compactness of HiGees still remains the key parameter governing applicability thereof as the overall footprint of such a design can also be a limiting factor or drawback. One significant drawback for use in a wide number of applications; however, is that the effectiveness of reactors can be significantly diminished due to impact of exothermic/endothermic reactions. That can become a critical problem, especially, for compact reactors which achieve significant volumetric intensification of the chemical processes while having fewer opportunities for providing effective thermal management. Currently, conventional designs do not address this drawback. Conventional apparatus, in fact, ignore the potential impacts that heat transfer can have on separation, absorption, desorption and interphase heat exchange capabilities.

A wide variety of RPB designs exist, and of considerable interest herein, are liquid-gas types. These liquid-gas types are seen as interesting in the industry for being highly efficient in cleaning harmful components of the flue gases, as well as for purposes of $CO_2$ capture. As $CO_2$ takes on more importance for industry, industry looks to science and engineering to solve these issues.

The simplest design of RPB is introduced with what is called "mono-block packing". For the sake of increasing effectiveness and manufacturability, a variety of packings (materials placed inside the RPB) have been proposed such as wire-mesh, foams, and beads (see FIG. 2a). These systems use a doughnut shape geometry. The resulting RPBs have several limitations to their capabilities, which include:

variation in flow area leads to a significant decrease in radial velocities of the gas and liquid along the radius, which, in turn, adversely affects the allowable throughputs (due to flooding) and local mass transfer coefficients;

it is known that rotational motion affords the use of high interfacial packing, and enhances a liquid-side coefficient but such rotational motion does not enhance the gas side mass-transfer coefficients with an exception mentioned below;

also, the mono-block packing design represents some more limitations such as low tangential slip velocities and low residence of gas in RPBs; and for the most conventional mono-block RPBs, due to their design features, the heat transfer capabilities are very limited.

To overcome most of the above limitations, special packing arrangements may be used. These special packing arrangements are not optimal. Besides mono-block packing, there are at least four common types of RPBs: with split packing (see, FIG. 2b); with baffles and blades (see, FIG. 2c); a zigzag configuration (see, FIG. 2d); and spinning disc/rotor-stator reactor (see, FIG. 3). Despite these designs, the conventional apparatuses are not specifically developed to solve heat transfer problems.

An effective method of the local mass-transfer coefficient equalization versus the beds radius has also been proposed. In this method and associated designs, it is proposed to replicate liquid entrance conditions over the bed by dividing the packing into annular rings with the proper gaps between them (see, FIG. 2b). To overcome most of the limitations, the design of RPBs with split packing has been developed.

Other prior art embodiments have undertaken the effort to equalize the mass-transfer coefficient over the bed (see, FIG. 2c). Variants of this HiGees design have "baffles and blades"

and "pins". This kind of RPBs design has several serious drawbacks including low interfacial area and low compactness, which lead to low effectiveness of RPBs in general.

The requirement to have multiple feeds along the axis of the bed made favorable ground for the proposal of zigzag RPBs. An apparatus like this utilizes coupled circular stator and rotor discs (see, FIG. 2*d*). The stationary disc is normally placed on top and can be used for multiple liquid feeding with the opportunity to organize the feed as driven by gravity only in order to minimize energy losses on its supply. The design feature of reactors of this type is compatibility with different measures of intensification of heat and mass transfer processes. Indeed, it is simple to extract or provide heat through stator of the RPB as it is connected to casing and the heat source or cooler can be placed externally for the design simplification. These, in turn, facilitate setting multiple units on a single shaft. It is worth noting here that most of the zigzag RPBs are with multiple rotating units that, obviously, are explained by their high compactness/ efficiency.

The last type of RPBs under consideration by industry is the spinning disc/rotor-stator reactor (see, FIG. 3). This kind of RPBs uses the principle of contra directional flow of gas and liquid film thinning and accelerating by spinning discs. The simplicity and manufacturability of design as well as its high operation ability conditioned that this kind of reactor occupied a significant place in the whole RPBs' family. The design based on the principle of a rotating disc is also very suitable for the placement of heat exchangers. In fact, the thickness of the disc allows the placement of heat-conducting elements in the rotor part of the RPB such as heat pipes and tubes in which cooling/heating liquids can circulate. It should be noted that, in contrast to the previously reviewed designs, where heat is exchanged between the gas and liquid phases, heat exchange between the liquid and structural elements is considered here. That allows uniform temperature control of the liquid inside the reactor by heating/ cooling the liquid inside the reactor, accurately in the area of the exothermic/endothermic reactions; while in most cases, this effect cannot be achieved by heating/cooling the liquid before it enters the reactor. It is also important to emphasize that the heat transfer placement in the rotor part of RPB is highly effective where the interaction surface and convection are maximized. In this design the cooling fluid is going through spiral passages just under the disc surface thereby ensuring the most efficient removal or supply of heat to the reaction zone. At last, the efficiency of this kind of reactor can be significantly increased even more in the case of the usage of a design option with multiple discs. This type of RPB is also suitable for heat introduction of heat exchange elements for both: rotor and stator parts. This design; however, does not have the efficiency that is needed by industry. Conventional apparatus, for example, need to provide two different apparatuses, namely a large heat exchanger and a rotating packed bed arrangement to achieve temperature controls needed in some processes. Such conventional apparatuses are inefficient from a footprint standpoint as well as expensive from a cost perspective. In activities such as carbon capture technologies, such dual apparatuses are extremely inefficient and expensive.

There is a need; therefore, to have a rotating packed bed apparatus that is much more efficient than current alternatives. Such alternatives should be able to have superior mass transfer throughput without needing a large footprint with an industrial facility. Furthermore, there is a need to provide for accurate temperature control, either heating or cooling, within a rotating packed bed apparatus that is not achievable by conventional designs.

There is a need to introduce a method and design which would allow the RPB the ability to maintain or increase effectiveness and efficiency, compared with the conventional apparatus discussed above.

There is a need to provide an apparatus and methods that are easier to operate than conventional apparatus and methods for packed bed technologies.

There is a further need to provide an apparatus and methods that do not have the drawbacks discussed above, namely being the limiting portion of the industrial process due to limited efficiency.

There is a still further need to reduce economic costs associated with operations and apparatus described above with conventional packed bed designs.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

In one embodiment, an apparatus is disclosed. The apparatus may comprise a casing defining an interior volume, the casing having a plurality of entrances and a top and bottom opening of the casing. The apparatus may further comprise at least one disc configured to rotate around an axis, the at least one disc placed within the interior volume. The apparatus may also comprise a shaft with a first end and a second end, the shaft connected to the disc to rotate the disc around the axis. The apparatus may also describe a set of heat conductors placed within the disc, wherein upon rotation of the shaft, the at least one disc is configured to rotate and wherein a fluid with a liquid phase is at least one of separated, absorbed, desorbed into the liquid phase and a gas phase upon rotation of the at least one disc and performing a heat transfer on the fluid and wherein the liquid phase is configured to exit the bottom opening of the casing and the gas phase is configured to exit the top opening of the casing and wherein the casing is configured to be injected with a gas into the plurality of entrances.

In another example embodiment, an apparatus is disclosed. In this example embodiment, the apparatus may comprise a casing defining an interior volume, the casing having a plurality of side entrances and a top and bottom opening of the casing. The apparatus may also comprise at least two discs configured to rotate around an axis, the at least two discs placed within the interior volume. The apparatus may also comprise at least one stationary disc placed within the interior volume, the at least one stationary disc placed between each of the at least two discs configured to rotate around the axis. The apparatus may also comprise a shaft with a first end and a second end, the shaft connected to the at least two discs configured to rotate the disc around the axis. The apparatus may also comprise a set of heat conductors placed one of on and within the at least two discs configured to rotate around the axis, wherein a fluid with a liquid phase entering the casing is at least one of separated, absorbed, desorbed into the liquid phase and a gas phase upon rotation of the at least two discs and wherein the liquid phase is configured to exit the bottom opening of the casing and the gas phase is configured to exit the top opening of the casing and wherein the casing is configured to be injected with a gas into the plurality of entrances.

In another example embodiment, a method for separating a fluid stream into a liquid phase and a gas phase is disclosed. The method may comprise providing the fluid stream to a rotating packed bed arrangement. The method may also comprise inserting the fluid stream into the packed bed arrangement. The method may also comprise rotating at least one disc within a casing of the packed bed arrangement, wherein the fluid stream contacts the at least one disc, wherein the at least one disc is configured with a set of heat conductors, wherein during the rotation a heat transfer occurs between the fluid stream and the set of heat conductors. The method may also comprise separating the fluid stream into the liquid phase and the gas phase through rotation of the at least one disc during the heat transfer. The method may also comprise discharging the liquid phase and the gas phase from the rotating packed bed arrangement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are; therefore, not be considered limiting of its scope, for the disclosure may admit to other equally effective embodiments.

Figure 1:
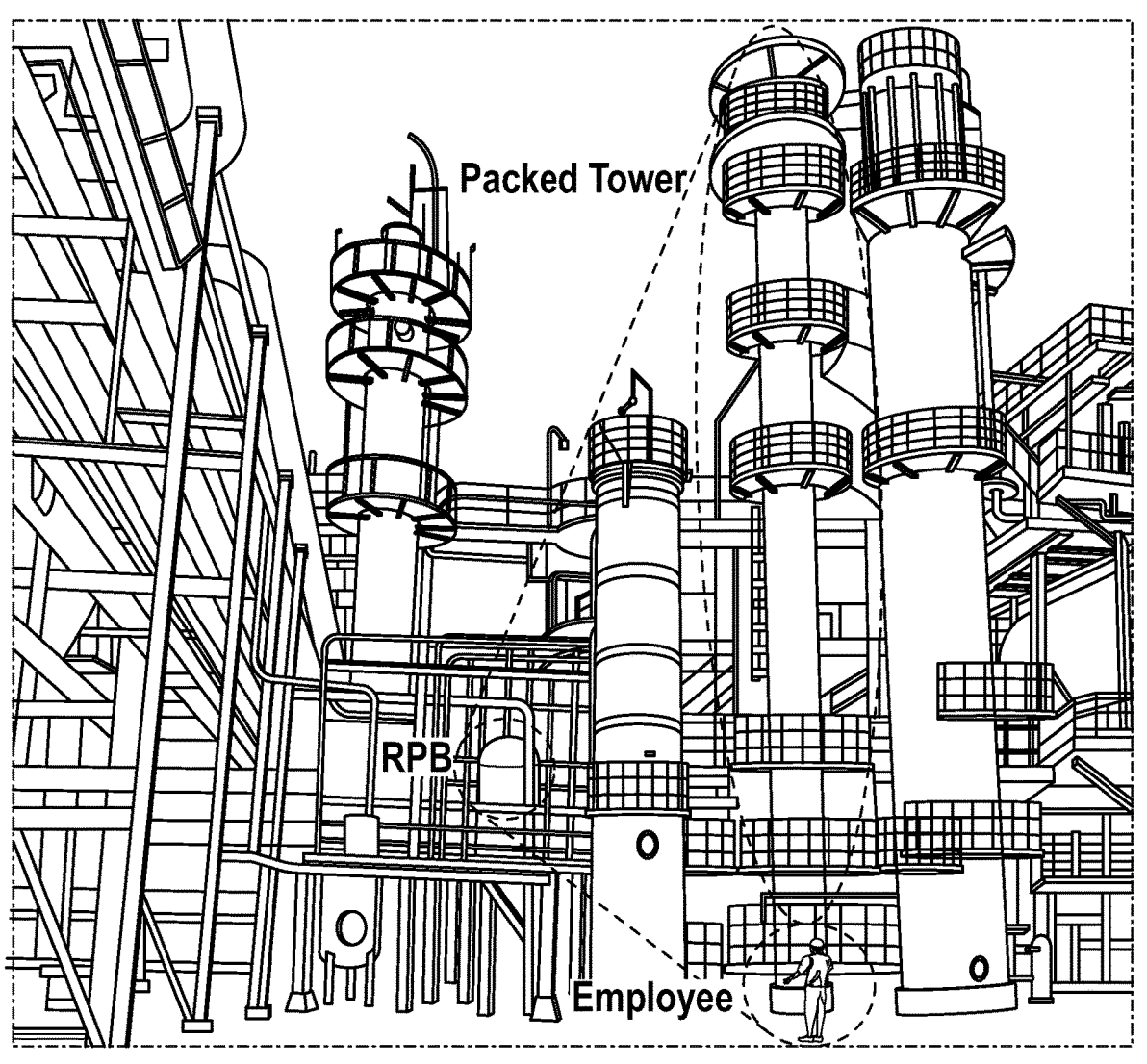
FIG. 1 is a side view of a conventional packed tower and a rotating packed bed in industry.
Figure 2:
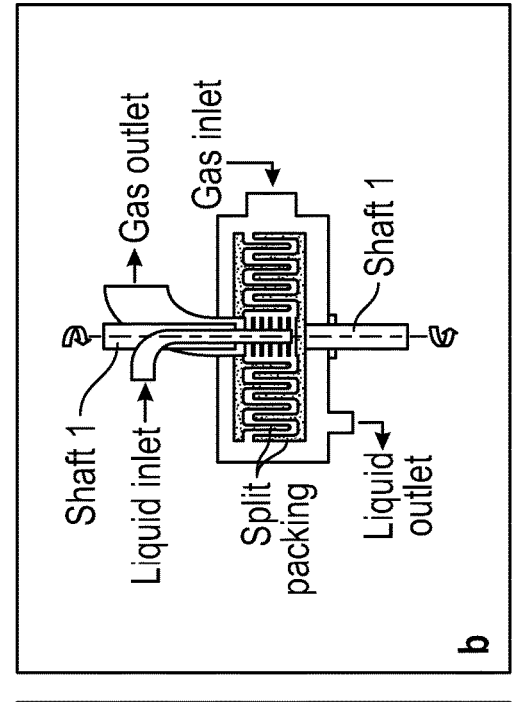
FIGS. 2a, 2b, 2c and 2d are different HiGees prior art designs.
Figure 2:
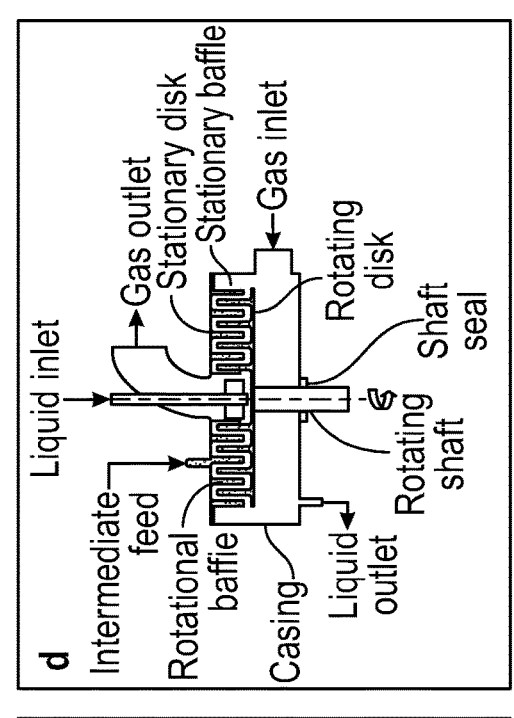
Figure 2:
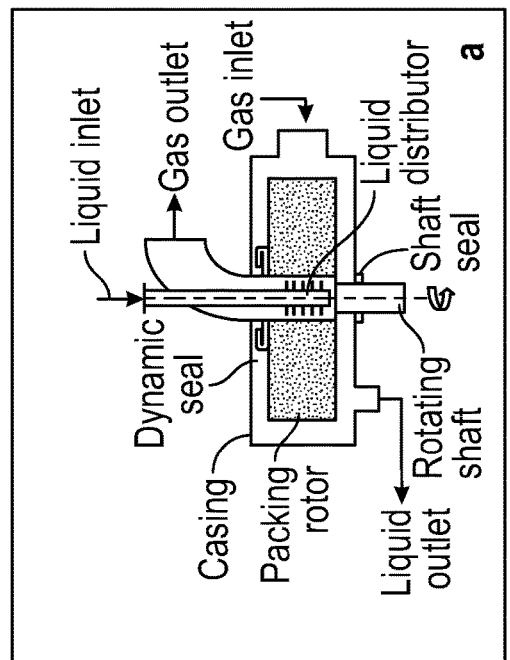
Figure 2:
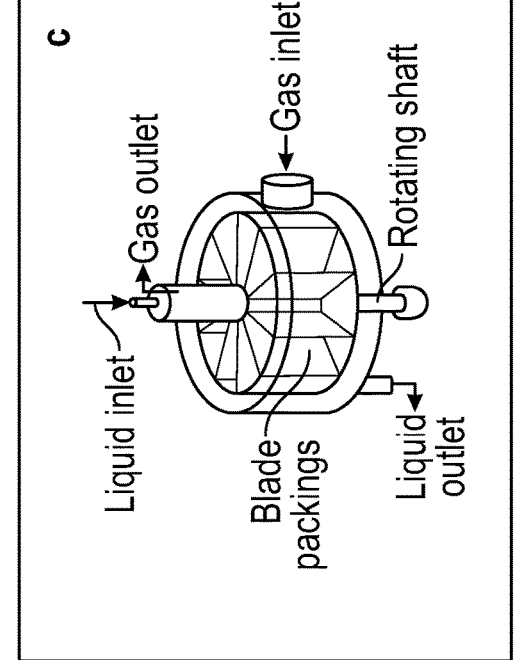
Figure 3:
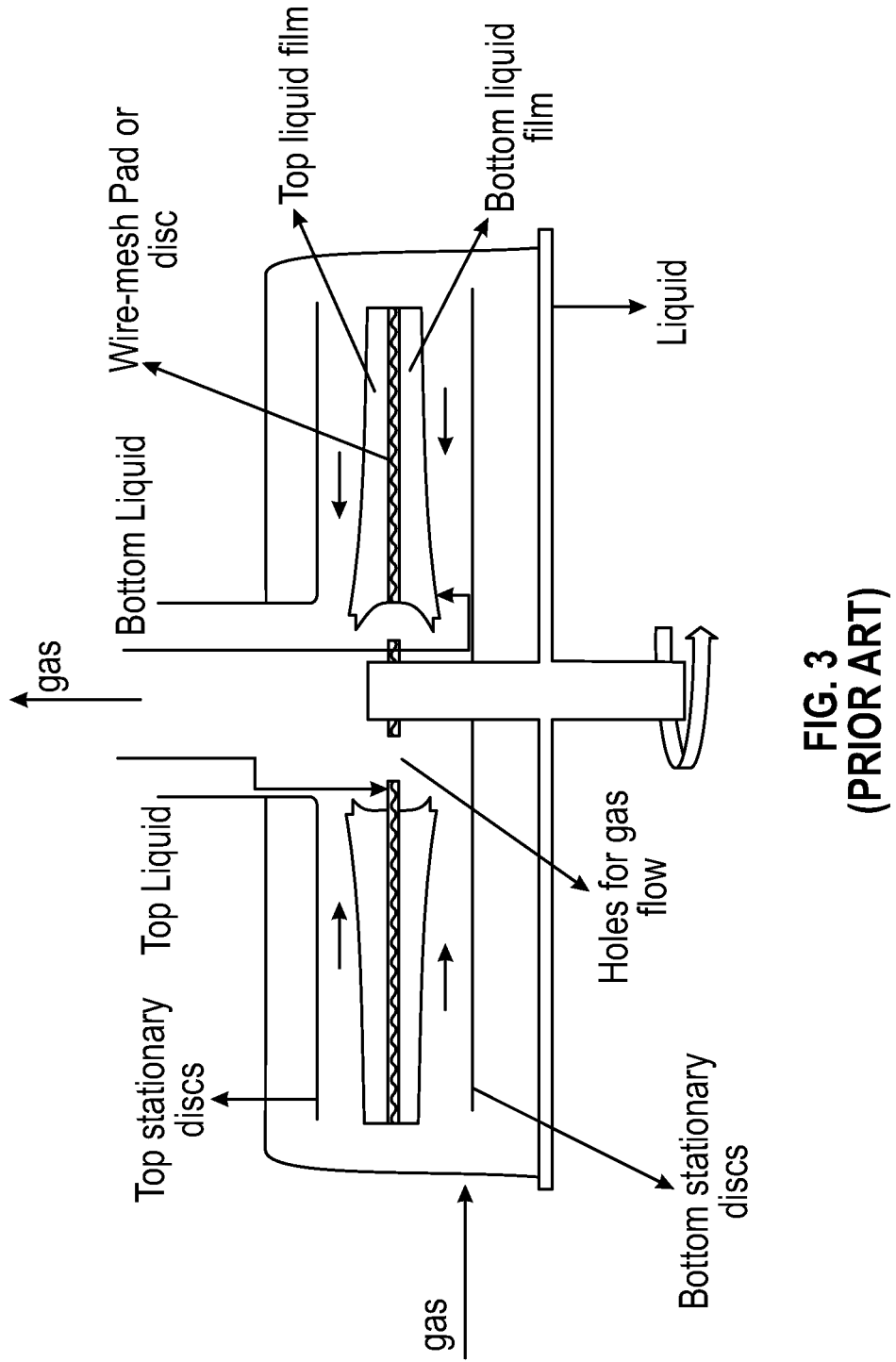
FIG. 3 is a cross-sectional view of a conventional spinning disc/rotor-stator reactor.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections; these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," ""engaged to,""connected to," or "coupled to" another element or layer, it may be directly on, engaged, connected, or coupled to, the other element or layer, or interleaving elements or layers may be present. In contrast, when an element is referred to as being "directly on,""directly engaged to,""directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 4:
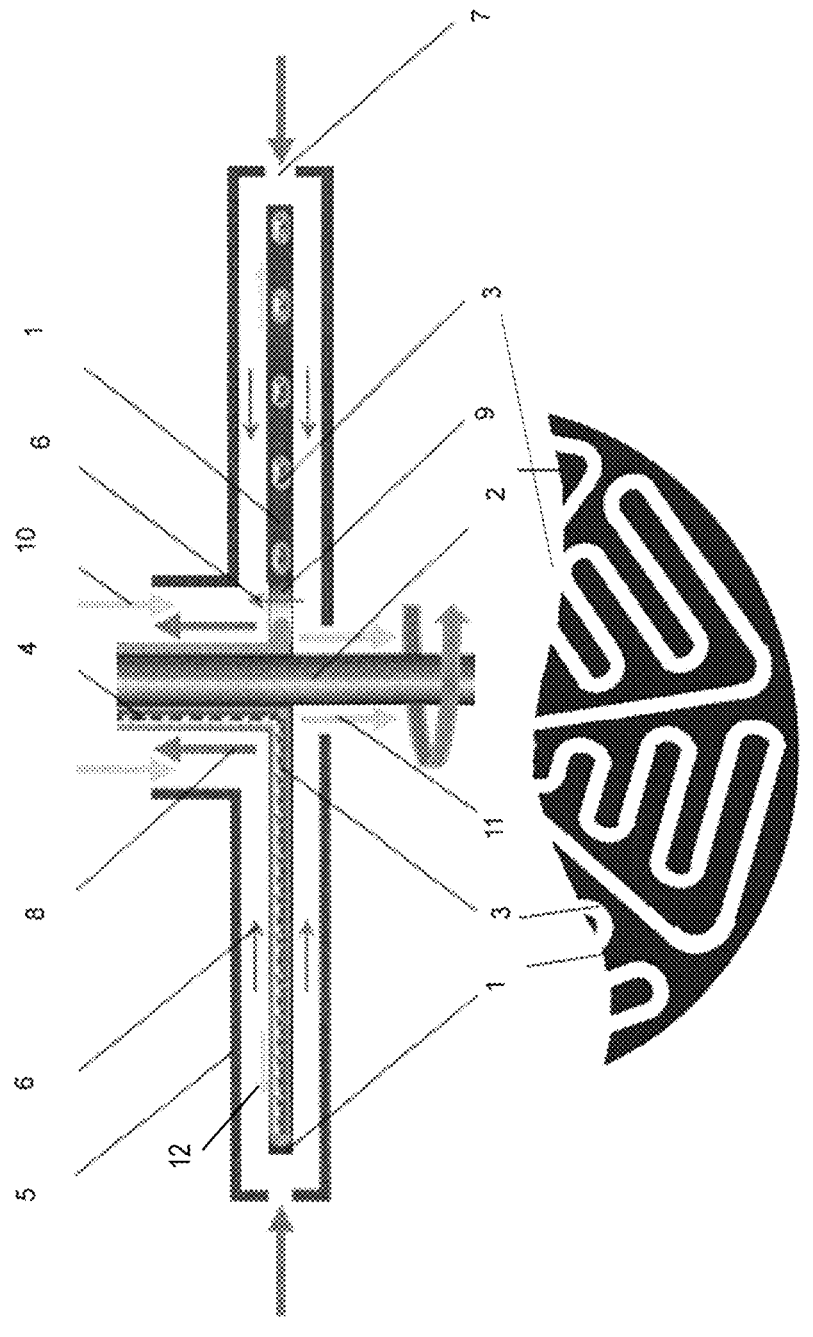
FIG. 4 is a rotating packed bed side view and top view of one example embodiment of the disclosure.

Referring to FIG. 4, one aspect of the disclosure is illustrated. The disclosure provides a novel heat transfer method and design for RPBs (HiGees) based on heat pipe or fluid circulation technologies. Such heat transfer capabilities in conventional apparatus are ignored. By incorporating heat transfer capabilities, greater separation, absorption, desorption and interphase heat exchange capabilities can be achieved through the embodiments provided. Such heat transfer capabilities are especially important for control of various aspects of separation, absorption, desorption and interphase heat exchange processes. For example, during carbon capture activities, solvent temperature can be increased or decreased, thereby affecting the absorbance reaction rates and volume of $CO_2$ absorbed. As separation, absorption, desorption and interphase heat exchange/transfer processes occur during the same step, rates can be controlled by operators. This provides flexibility of operations not achieved in conventional apparatus.

Embodiments of the disclosure are sufficiently efficient such that the RPB may act as a stand-alone heat exchanger, wherein a solvent absorbs $CO_2$ at low temperatures and desorbs $CO_2$ at higher temperatures.

The method and design imply intensification of the heat transfer process between RPB elements and, predominantly, the liquid components of fluids. In one example embodiment relevant to carbon capture, an amine solvent may be used to provide/enhance carbon capture. As carbon capture is steadily becoming an important capability, this disclosure provides many advantages over conventional apparatus that cannot replicate such capabilities. One feature of the method and design is the installation of heat-conducting elements not only to the stator part (casing, for instance) but to the rotor part of RPB. Such a configuration is highly efficient where the greatest part of the heat gradient is concentrated due to the localization of heat of absorption/desorption during chemical reactions. FIGS. 4, 5, 6, and 7 demonstrate some, but not all, possible embodiments of the current disclosure.

In one embodiment as a single-disc, heat transfer elements are introduced inside the disc body that situates them closely to the disc surface which is in contact with liquid (see, FIG. 4). As will be understood, the heat transfer elements may be located inside the disc body or may directly abut the surface of the disc surface. During motion of the disc, high gravity experienced by the fluid, pushes the liquid as a thin film towards the disc circumference. This results in the liquid obtaining a high velocity, provoking a forced convection regime of liquid-to-solid heat transfer. A heat exothermic/endothermic reaction zone is situated adjacent to the cooling/heating element and exchanges heat with it in the most efficient regime, namely forced convection. Further, heat enters or is removed by means of heat conductors in the form of heat pipes or circulating liquid coolant. As mentioned previously, the stator elements such as casing wall, top, bottom, etc., can be also used for the installation of heat elements; however, the efficiency of that may be limited despite the heat transfer process being much simpler. In embodiments, a multi-unit technique is applicable for this kind of RPB and allows to situate the heat transfer elements in the plurality of the discs (see, FIG. 5). In embodiments, systems requiring many stages may be used for the attainment of performance at higher gas/liquid flow rates that allow having more compact design as result of placing multi-unit in one casing. The aspects of the disclosure are not limited by the RPBs usage as a reactor only, high heat transfer capabilities allow it to use as an indirect heat exchanger, vaporizer, or condenser at specific conditions as well.

The method and the design are distributable for other kinds of RPBs. The most representative case is the usage of the method in the zigzag RPB. In this case, heat transfer elements are introduced inside the disc and walls bodies that situate them closely to the surfaces which are in contact with liquid (see, FIG. 6). As previously, this heat transfer method allows the heat transfer elements in the plurality of the discs and walls to efficiently be located in close proximity of the fluid, thereby this embodiment is applicable for multi-stage zigzag RPBs, too (see, FIG. 7). As will be understood, heat transfer may allow for heat to be transferred into the casing or heat to be removed from the casing. The disclosure is not limited to adding or removing heat. The amount of heat added or removed may be calculated by operators, for all embodiments discussed, to maximize the desired output of the rotated packed bed.

Referring to FIG. 4, the RPB interior consists of disc 1 connected to shaft 2 which is the center of the rotation of the whole interior (see, FIG. 4). There is a plurality of the heat conductors 3 installed inside disc 1. The design of the heat conductors can be based on different physics principles such as channels filled up with the coolant, heat pipes, or, eventually, metal/alloy heat conductors. They can have different geometrical configurations such as coil (represented for instance in FIG. 4), single-or multi-start helix, or any other applicable one. In some non-limiting embodiments, a single unit may be used or a number of different units may be placed together. In further embodiments, the heat conductors may have a radial or tangential disposition. Despite the possible diversity of the design of heat transfer conductors 3, they have common properties: all of them may cover as much of disc's 1 surface as possible and have an exit part 4 (from the RPB to the external heat exchanger), which is easiest to situate inside the shaft 2 or along the surface of the shaft 2. At the same time, both ends of the heat pipes or coolant pipelines/heat conductors 3 should be withdrawn outside of RPB. The channels formed between casing 5 and disc 1 can have heights of 3-30 mm, in non-limiting embodiments. Such dimensions are only for descriptive terms and the dimensions may be larger or smaller as needed. The rotating discs 1 can have passages 9 around the shaft 2 for the gas 6 to flow from the gas openings 7 to the gas exit 8. The liquid 10 fed into RPB from the top reaches the surface of the disc 1 by driven gravitation. The disc's 1 surface, contacting with liquid, can have different types and roughness (plain or grooved, waved, textured, or covered by metal foam, wire mesh, or woven layers). Thus, the disc's 1 top surface is being covered by thin liquid film 12 flowing radially outward due to centripetal acceleration. After, the liquid leaves the disc's 1 rim as a thin sheet of droplets. These droplets form a film on the casing 5 wall, which flows down to the bottom of the casing 5 to the exit 11. The gas 6 supplied through openings 7 in the casing 5, flows through annular channels formed between liquid films, flowing over rotating discs 1, to the exit 8 located at the top of the casing 5. The gas 6 acquires tangential velocity in the annular channels due to torsional stress induced by the rotation of the disc 1. The sum of the radial velocity (due to radial flow) and tangential velocity (due to torsional stress) leads to a converging spiral flow inside channels.

Referring to the top portion of FIG. 4, a longitudinal section of the RPB is presented and the horizontal section (view of the disc above) is presented by the bottom portion. As will be understood, the surface of the disc may have many configurations that may be dictated by the type of liquid being at least one of separated, absorbed, desorbed, from the gaseous phase.

The motor supplies the shaft 2 with the rotation torque through the gearbox. The whole assembly (motor and gearbox) may be housed in the casing 5. The contact of the phases for separation, absorption and desorption or reaction takes place in the annular channels and to a minor extent in the casing 5. In other embodiments, the motor and gearbox may be remote from the casing 5.

Figure 5:
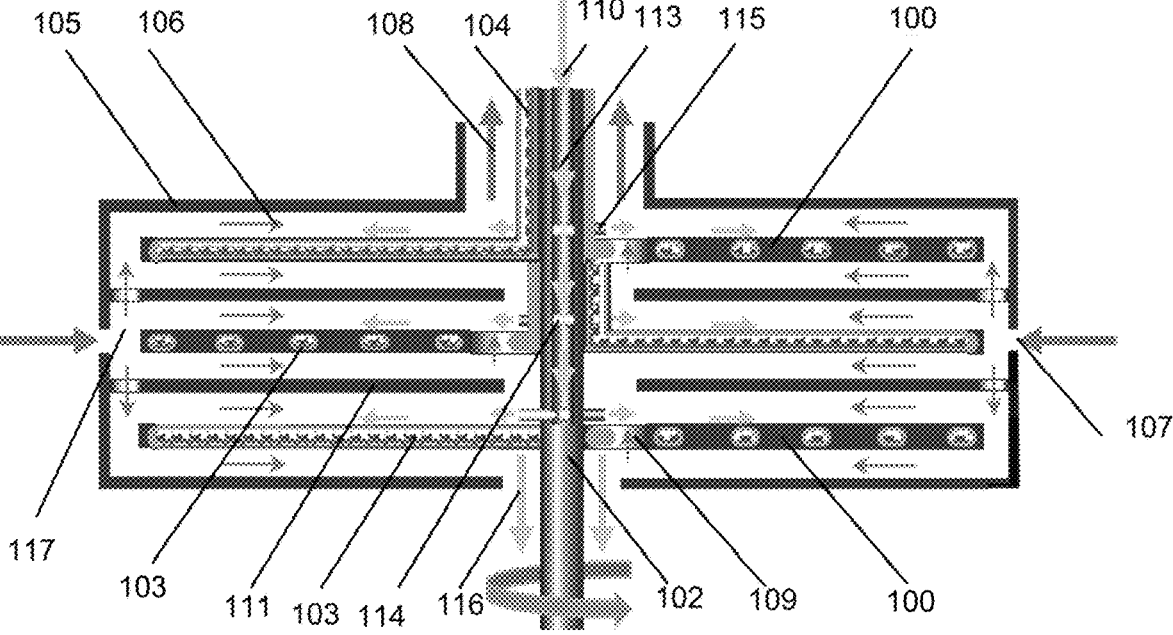
FIG. 5 is a side cross-sectional view of a multi-disc/multistage rotating packed bed in one example embodiment of the disclosure.

The method and design applied to the multi-disc/multi-stage RPB are presented by another embodiment below (see, FIG. 5). Referring to FIG. 5, the interior of the casing 105, in this embodiment, comprises of a plurality of discs 100 connected to shaft 102 which is the center of the rotation. The overall number of the discs 100 can be as minimum as 2. In some embodiments, ten or more discs may be used. Each rotating disc 100 is provided with a plurality of the heat conductors 103 installed inside. As will be understood, the heat conductors 103 may be heat pipes, liquid and/or a metal alloy. As previously described, the design of the heat conductors 103 can be based on different physics principles, and they can have different geometrical configurations. Also, the heat transfer conductors 103 should cover as much of the disc's 100 surface as possible and have exit parts 104 connected to an external heat exchanger. Entry and exit parts 104 can be situated inside shaft 102 or along the surface of shaft 102, while both ends of the heat pipes or coolant pipelines/transfer conductors 103 are withdrawn outside of RPB. Stationary discs 111 with a central hole to pass the shaft 102 are installed, in one embodiment, equidistantly between rotating discs 100 with support on the internal surface of the cylindrical part of the casing 105. The channels formed between casing 105 and discs 100 or stationary discs 111 and rotating discs 100 can have heights of 3-30 mm. Other configurations are possible. The rotating discs 100 can have passages 109 around shaft 102 for the gas 106 to flow from the gas openings 107 to the gas outlet 108. With the same purpose the stationary discs 111 can have passages 117. The discs' 100 surface, contacting with liquid, can have different types and roughness (they can be plain or grooved, waved, textured, or covered by metal foam, wire mesh, or woven layers). In other embodiments, a surface coating may be used. Mechanical deformations may also be used, such as an etching. In still other embodiments, etching may be performed through chemical etching.

The liquid 110, fed into shaft 102, flows from the top via liquid line 113 and is distributed by the holes 114 and injected through the nozzles 115 onto the top and bottom surfaces of the discs 100. Thus, all the discs' 100 surfaces are covered by thin liquid films, flowing radially outward due to centripetal acceleration. After, the liquid leaves the discs 100 rims as a thin sheet of droplets. These droplets form a film on the stationary discs 111 surfaces, which flows down through the central opening of the stationary discs 111 and stationary discs' openings 117 due to gravity to the bottom of the casing 105. The liquid 110 eventually travels to the exit 116. The liquid 110 eventually gets collected from the exit 116. The gas 106, supplied into casing 105 through openings 107, flows to outlet 108, located at the top of casing 105 through the following: stationary discs' openings 117. The gas 106 may travel through annular channels, formed between liquid films on the rotating discs 100 and stationary discs 111 or internal surfaces of the casing 105. The gas 106 may also travel through passages 109 of the rotating discs 100 and the central holes of the stationary discs 111. The gas 106 acquires tangential velocity in the annular channels due to torsional stress induced by the rotation of the discs 100.

Figure 6:
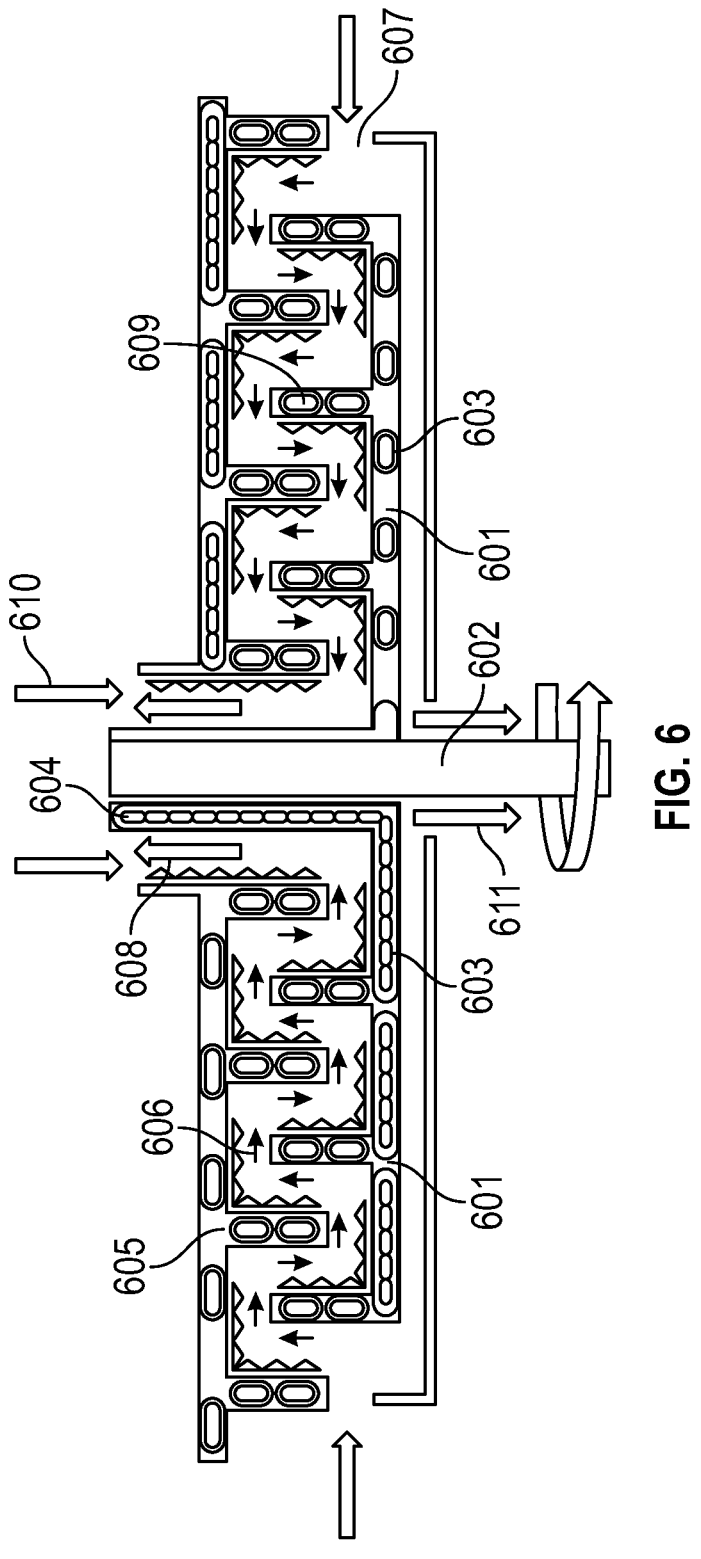
FIG. 6 is a side cross-sectional view of a zigzag rotating packed bed in one example embodiment of the disclosure.

Another example embodiment is illustrated in FIG. 6. In this embodiment, a zigzag design is used. Referring to FIG. 6, in this configuration, the casing 605 and the disc/rotor 601 may define a tortuous path for separation, absorption and desorption of the fluid entering the arrangement.

The RPB interior consists of disc or rotor 601 connected to shaft 602 which is the center of the rotation of the whole interior. Disc/Rotor 601 consists of the disc part with several walls 609. There is a plurality of the heat conductors 603 installed inside rotor 601. As previously, the design of the heat conductors can be based on different physics principles, and they can have different geometrical configurations. Also, the heat transfer conductors 603 should cover as much of the disc's 601 surface as possible and have exit parts 604 connected to the external heat exchanger. Entry and exit parts 604 can be situated inside shaft 602 or along the surface of shaft 602. The top part of casing 605 of the RPB comprises the cover part and walls 609 which are situated between walls 609 of rotor 601. In one embodiment, the walls 609 and the cover part are placed at an equidistant distance. The cover part and the walls 609 of the top part of the casing 605 are also equipped with heat conductors, which are connected to the external heat exchanger. As with the other configurations, heat may be removed or added to the arrangement in FIG. 6, as needed. The channels' sizes formed between casing 605 and rotor 601 can have heights of 3-30 mm in one embodiment. The liquid 610 is fed into RPB from the top and, driven by gravitation, reaches the surface of rotor 601. The rotor's 601 and casing's 605 surfaces, contacting with liquid, can have different types and roughness (for example, the surfaces can be plain or grooved, waved, textured, or covered by metal foam, wire mesh, or woven layers). Thus, some of the rotor's 601 and casing's 605 surfaces are covered by the liquid 610 flowing generally outward due to centrifugal force. After, the liquid leaves the rotors 601 rim as a thin sheet of droplets. These droplets form a film on the casing 605 wall, which flows down to the bottom of casing 605 to exit 611. The gas 606 supplied through openings 607 in casing 605, flows through channels formed between rotor's 601 and casing's 605 surfaces to the exit 608 located at the top of casing 605. The gas 606 acquires tangential velocity in the annular channels due to torsional stress induced by the rotation of rotor 601.

Figure 7:
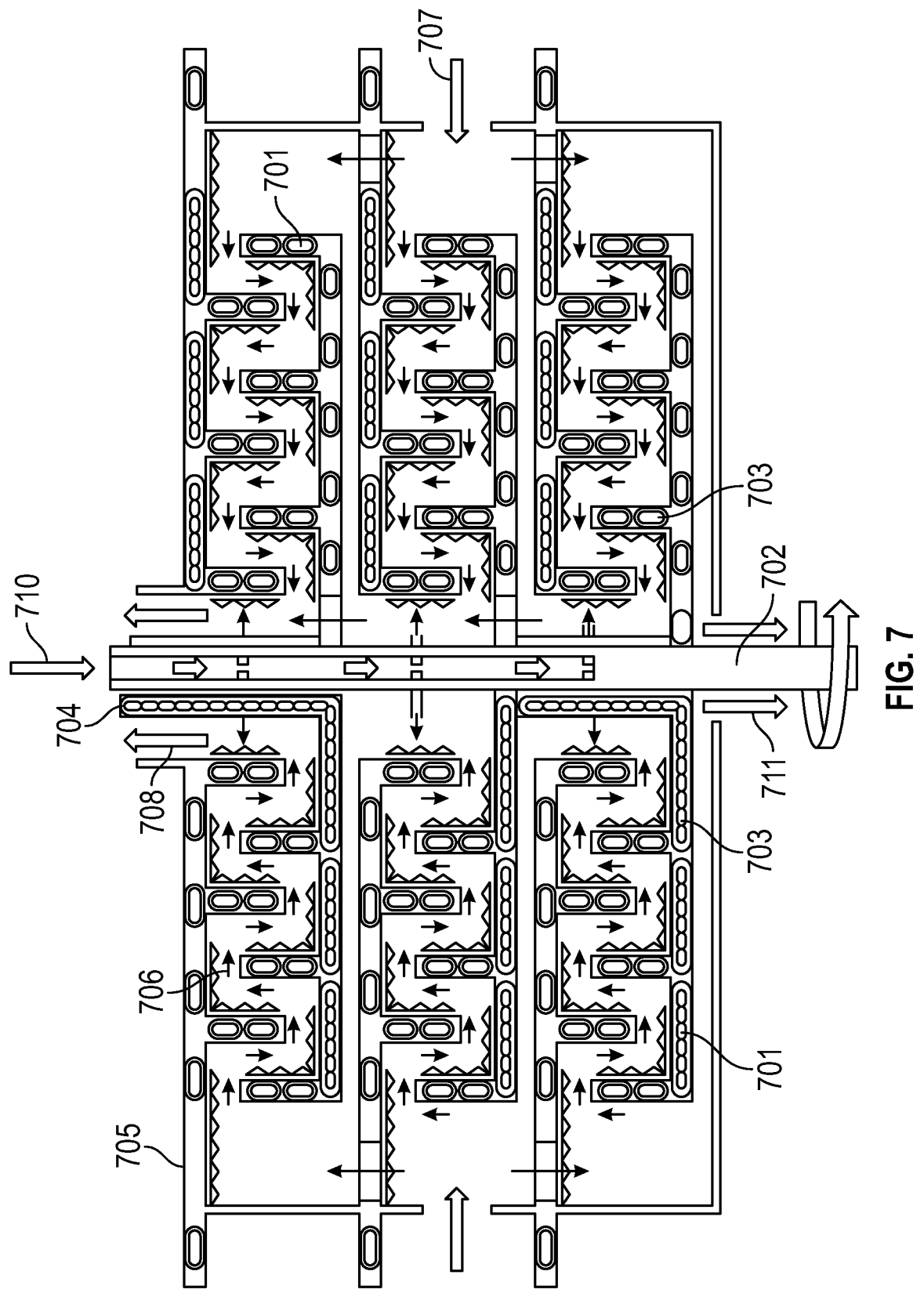
FIG. 7 is a side cross-sectional view of a multi-disc/multistage zigzag rotating packed bed in one example embodiment of the disclosure.

Likewise, the multi-disc/multistage principle can be applied to the zigzag RPB. Referring to FIG. 7, the method and the design of the multi-rotor/multistage zigzag RPB are presented by another embodiment. The overall number of the rotors or discs 701 can be as minimum as 2. In other embodiments, the number of rotors or discs 701 can have 10 rotors or discs 701 or more. As illustrated, several arrangements in FIG. 6 may be stacked to provide separation, absorption, desorption, and interphase heat transfer capabilities greater than a single unit. In the embodiment described below, although described as a "rotor", a disc may equally be used.

The RPB interior consists of rotor 701 connected to shaft 702. The shaft is provided with rotational capability for each rotor 701 in the arrangement. The rotor 701 consists of the disc part with several walls. There is a plurality of the heat conductors 703 installed inside rotor 701. As previously, the design of the heat conductors 703 can be based on different physics principles, and they can have different geometrical configurations. Also, the heat transfer conductors 703 may be configured to cover as much of the rotors 701 surface as possible. Exit parts 704 are provided and connected to an external heat exchanger. Entry and exit parts 704 can be situated inside shaft 702 or along the surface of shaft 702, while both ends of the heat pipes or coolant pipelines are withdrawn outside of RPB. The casing 705 of the RPB comprises the cover part and walls which are situated between walls of rotor 701 presumably equidistantly. The cover part and the walls of the top part of the casing 705 are also equipped with heat conductors, which are connected to the external heat exchanger. The channels' sizes formed between casing 705 and rotor 701 can have heights of 3-30 mm in one example embodiment. The liquid 710 is fed into RPB from the top and, driven by gravitation, reaches the surface of rotor 701. The rotor's 701 and casing's 705 surfaces, contacting with liquid, can have different types and roughness (plain or grooved, waved, textured, or covered by metal foam, wire mesh, or woven layers). Thus, some of the rotor's 701 and casing's 705 surfaces are covered by the liquid 710 flowing generally outward due to centrifugal force (see, FIG. 6). After, the liquid leaves the rotor's 701 rim as a thin sheet of droplets. These droplets form a film on the casing 705 wall, which flows down to the bottom of casing 705 to exit 711. The gas 706 supplied through openings 707 in casing 705, flows through channels formed between rotor's 701 and casing's 705 surfaces to the exit 708 located at the top of casing 705.

Figure 8:
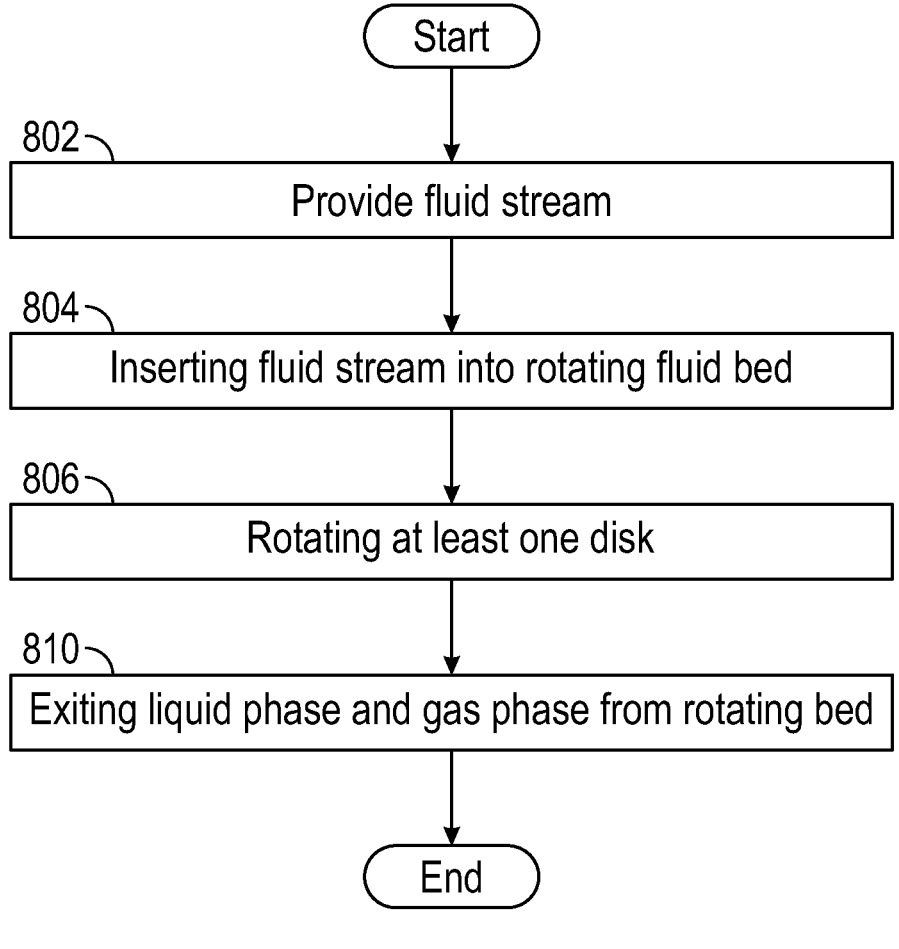
FIG. 8 is a method of performing an operation on a rotated packed bed, in one example embodiment of the disclosure.

Referring to FIG. 8, a method 800 of one of separating, absorbing and desorbing a fluid into a liquid phase and a gas phase is illustrated in accordance with one example embodiment of the disclosure. The method 800 involves providing a fluid stream to a rotating packed bed arrangement at 802. The method continues with inserting the fluid stream into the rotating packed bed arrangement at 804. The method further continues with, at 806, rotating at least one disc within a casing, wherein the fluid stream contacts the rotating at least one disc and wherein the at least one disc is configured with a set of heat conductors with the at least one disc. During this step, heat transfer can occur to the fluid stream. The method may further continue with, one of separating, absorbing, and desorbing the fluid into the liquid phase and the gas phase through rotation of the packed bed arrangement. The method further continues with, at 810, exiting the liquid phase and a gas phase from the rotating packed bed arrangement. As will be understood, multiple discs may be used to separate, absorb or desorb the fluid. In other embodiments, multiple fluid streams may be injected into the rotating packed bed arrangement. In still further embodiments, the at least one disc that rotates may help define a tortuous path in conjunction with the casing to help in separation, absorbing and desorbing. In still further embodiments, the heat conductors may be used to cool or heat the fluid that is undergoing separation, absorbing and desorbing. In further embodiments, both the liquid phase and the gas phases may be separately collected.

Embodiments of the apparatus and methods above can be performed in conjunction with digital apparatus. Such digital controlled apparatus may include computing apparatus, such as computers, laptops, servers and cloud computing-based units. These digitally controlled apparatus may be programmed with non-volatile computer instructions to allow the digital control of equipment within the field. Such control may, in some alternatives, use artificial intelligence networks or systems. In some further embodiments, the artificial intelligence networks may have feedback loops to allow the network to be trained to become more efficient over time. Operations; therefore, may be optimized according to past events, thereby saving costs. Control units on the RPBs may have their own computing apparatus that link to network servers, for example, to allow for remote operation of the RPB. Input parameters, such as fluid flow, temperature control (in and out) may also be controlled through the use of solenoid valves that have actuators that are controlled either locally, through artificial intelligence and/or from a remote workstation. Records may be kept by the computing apparatus and the optimum processing may be achieved by periodic "re-learning" of the system based on previous performance instead of a training set provided by programmers. Embodiments using artificial intelligence may use a single node layer that is updated periodically. Other embodiments using artificial intelligence may use multiple layer technology to provide a deeper learning capability.

Examples of different embodiments will next be disclosed. The non-limiting embodiments are provided for description. In one embodiment, an apparatus is disclosed.

The apparatus may comprise a casing defining an interior volume, the casing having a plurality of entrances and a top and bottom opening of the casing. The apparatus may further comprise at least one disc configured to rotate around an axis, the at least one disc placed within the interior volume. The apparatus may also comprise a shaft with a first end and a second end, the shaft connected to the disc to rotate the disc around the axis. The apparatus may also describe a set of heat conductors placed within the disc, wherein upon rotation of the shaft, the at least one disc is configured to rotate and wherein a fluid with a liquid phase is at least one of separated, absorbed and desorbed into the liquid phase and a gas phase upon rotation of the at least one disc and performing a heat transfer on the fluid and wherein the liquid phase is configured to exit the bottom opening of the casing and the gas phase is configured to exit the top opening of the casing and wherein the casing is configured to be injected with a gas into the plurality of entrances.

In one example embodiment, the apparatus may be configured wherein the set of heat conductors is configured in a geometry of one of a coil and a helical shape, and wherein the set of heat conductors numbers at least one.

In one example embodiment, the apparatus may be configured wherein the set of heat conductors are filled with a material to conduct heat.

In one example embodiment, the apparatus may be configured wherein the material is one of a metal/alloy heat conductor and a liquid.

In one example embodiment, the apparatus may be configured wherein a top surface of the at least one disc is configured with one of a grooved, waved and textured surface.

In one example embodiment, the apparatus may further comprise a motor connected to the shaft, the motor configured to rotate the shaft.

In one example embodiment, the apparatus may further comprise a gearbox connected to the motor.

In one example embodiment, the apparatus may be configured wherein the plurality of entrances are configured in at least one shape of circular, oval, rectangular slots, a triangle and a pentagon or any other applicable shape.

In another example embodiment, an apparatus is disclosed. In this example embodiment, the apparatus may comprise a casing defining an interior volume, the casing having a plurality of side entrances and a top and bottom opening of the casing. The apparatus may also comprise at least two discs configured to rotate around an axis, the at least two discs placed within the interior volume. The apparatus may also comprise at least one stationary disc placed within the interior volume, the at least one stationary disc placed between each of the at least two discs configured to rotate around the axis. The apparatus may also comprise a shaft with a first end and a second end, the shaft connected to the at least two discs configured to rotate the disc around the axis. The apparatus may also comprise a set of heat conductors placed one of on and within the at least two discs configured to rotate around the axis, wherein a fluid with a liquid phase entering the casing is at least one of separated, absorbed and desorbed into the liquid phase and a gas phase upon rotation of the at least two discs and a heat transfer process on the fluid performed by the set of heat conductors and wherein the liquid phase is configured to exit the bottom opening of the casing and the gas phase is configured to exit the top opening of the casing and wherein the casing is configured to be injected with a gas into the plurality of entrances.

In another example embodiment, the apparatus may be configured wherein a space between each of the at least two discs configured to rotate around the axis and the at least one stationary disc is equidistant.

In another example embodiment, the apparatus may be configured wherein the shaft is configured to transport the fluid to a center of the apparatus and eject the fluid through at least one hole in the shaft.

In another example embodiment, the apparatus may further comprise at least one nozzle placed within the at least one hole in the shaft, the at least one nozzle configured to spray the fluid on to one of the at least two discs configured to rotate.

In another example embodiment, the apparatus may be configured wherein a top surface of the at least two discs is configured with one of a grooved, waved and textured surface.

In another example embodiment, the apparatus may be configured wherein at least a top surface of the at least two discs is covered with a woven layer, a wire mesh and a metal foam.

In another example embodiment, a method for interphase heat exchange is disclosed. The method may comprise providing the fluid stream to a rotating packed bed arrangement. The method may also comprise inserting the fluid stream into the packed bed arrangement. The method may also comprise rotating at least one disc within a casing of the packed bed arrangement, wherein the fluid stream contacts the at least one disc, wherein the at least one disc is configured with a set of heat conductors, wherein during the rotation a heat transfer occurs between the fluid stream and the set of heat conductors. The method may also comprise at least one of separating, absorbing and desorbing the fluid stream into the liquid phase and the gas phase through rotation of the at least one disc during the heat transfer. The method may also comprise discharging the liquid phase and the gas phase from the rotating packed bed arrangement.

In another example embodiment, the method may be performed wherein the set of heat conductors one of heats and cools the fluid stream.

In another example embodiment, the method may be performed wherein the separating, absorbing and desorbing the fluid stream into the liquid phase and the gas phase through rotation at least one disc is along a tortuous path.

In another example embodiment, the method may further comprise changing a speed of the rotating disc.

In another example embodiment, the method may further comprise collecting at least one of the liquid phase and gas phase.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An apparatus, comprising:
a casing defining an interior volume, the casing having a plurality of entrances, a top portion of the casing defining a top opening, and a bottom portion of the casing defining a bottom opening;
at least one disc configured to rotate around an axis, the at least one disc positioned within the interior volume;
a shaft with a first end and a second end, the shaft connected to the disc to rotate the disc around the axis;
a set of heat conductors positioned within the at least one disc, wherein, upon rotation of the shaft, the at least one disc is configured to rotate, wherein a fluid with a liquid phase entering the casing is at least one of separated, absorbed, and desorbed into the liquid phase and a gas phase upon rotation of the at least one disc and performing a heat transfer on the fluid, wherein the liquid phase is configured to exit the bottom opening of the casing and the gas phase is configured to exit the top opening of the casing, wherein the casing is configured to be injected with a gas into the plurality of entrances, wherein the at least one disc comprises a plurality of walls extending partially between the top portion and the set of heat conductors, such that the plurality of walls forms a plurality of channels having a zigzag configuration, and wherein the plurality of channels is in fluid communication with the plurality of entrances and with the top opening of the casing.

2. The apparatus according to claim 1, wherein the set of heat conductors has one of a coil shape and a helical shape.

3. The apparatus according to claim 1, wherein the set of heat conductors is filled with a material to conduct heat.

4. The apparatus according to claim 3, wherein the material is one of a metal/alloy heat conductor and a liquid.

5. The apparatus according to claim 1, wherein a top surface of the at least one disc comprises one of a grooved surface, a waved surface, and a textured surface.

6. The apparatus according to claim 1, further comprising a motor connected to the shaft, the motor configured to rotate the shaft.

7. The apparatus according to claim 6, further comprising a gearbox connected to the motor.

8. The apparatus according to claim 1, wherein each of the plurality of entrances forms at least one of a circular shape, an oval shape, rectangular slots, a triangular shape, or a pentagonal shape.

9. The apparatus according to claim 1, wherein the at least one disc is a first disc, wherein the apparatus further comprises at least a second disc stacked vertically on the first disc, and wherein the second disc comprises:
a second plurality of walls extending partially between a top portion of the second disc and a second set of heat conductors, such that the second plurality of walls forms a second plurality of channels having a zigzag configuration.

10. The apparatus according to claim 9, wherein the zigzag configuration is contained within the second plurality of walls, such that the second disc comprises a perimeter edge in which the second plurality of channels is not present.

11. The apparatus according to claim 1, wherein the set of heat conductors includes heat pipes.

* * * * *